Patented Mar. 2, 1954

2,671,106

UNITED STATES PATENT OFFICE 2,671,106

ESTERS OF UNSATURATED PHOSPHONIC ACIDS

Charles Joseph Albisetti, Jr., Elsmere, and Milton Jones Hogsed, Wilmington, Del., assignors to E. I. du Pont de Nemours & Company, Wilmington, Del., a corporation of Delaware No Drawing. Application October 20, 1950, Serial No. 191,316

5 Claims. (Cl. 260—461)

This invention relates to the preparation of esters of unsaturated phosphonic acids and to a new class of such esters.

Relatively low molecular weight phosphonic acids and their esters are known in the art. Furthermore, esters of short-chain, unsaturated phosphonic acids such as, diethyl ethylenephosphonate and diethyl 1-propene-1-phosphonate are also known—see, for instance, Ford-Moore and Williams, J. Chem. Soc. 1465 (1947). The polymerization and copolymerization of these short-chain, unsaturated phosphonate esters have been studied—see, for instance, Kabachnik, Bull. Acad. Sci. (U. S. S. R.) 233 (1947) and U. S. Patent 2,439,214. However, these references teach only the preparation of true high molecular weight polymers, which are of limited practical use. There is no teaching of the preparation of monomeric esters of long-chain, unsaturated phosphonic acids—compounds which, on a theoretical structural basis, should be of interest because of their desirable balance of chemically reactive groups, desirable solubility characteristics, and controllable hydrocarbon content.

An object of this invention is to provide a new class of esters of relatively long-chain, unsaturated phosphonic acids and a practical process of preparing same. Other objects will be apparent from the description of the invention given hereinafter.

The above objects are accomplished according to the present invention by reacting in the absence of a polymerization catalyst and at an elevated temperature a diester of an alkene-1-phosphonic acid in which the 2-carbon relative to the phosphorus carries at least one hydrogen, with an olefinic compound of at least 3 carbons and free of conjugated unsaturation, to form a diester of an alkene-4-phosphonic acid.

The invention further comprises, as a new class of esters, the diesters of alkene-4-phosphonic acids and, more particularly, those in which the alkene radical directly bonded to the phosphorus is of 5 to 18 carbons, inclusive, and the 1-carbon and the 2-carbon relative to the phosphorus each carries at least one hydrogen. A preferred group of these esters are the diesters which other than the phosphorus and the oxygen attached to the phosphorus are hydrocarbon and contain 1 to 7 carbons, inclusive, in each ester group and 5 to 18 carbons, inclusive, in the alkene radical directly bonded to the phosphorus.

It has now been found that the diesters of alkene-4-phosphonic acids may be prepared as described above. The diesters of the alkene-1-phosphonic acids used in the condensation reaction carry at least 1 hydrogen on the 2-carbon relative to the phosphorus and the diesters used in preparing the preferred alkene-4-phosphonates of this invention are those of this type which further are free of reactive, i. e., Zerewitinoff, hydrogens, with the two-ester groups being preferably solely hydrocarbons and of from 1 to 7 carbons each. The ester groups of the resulting alkene-4-phosphonates are similarly constituted.

The olefinic compounds used in the reaction of this invention are those having at least three carbons and which are free of conjugated unsaturation. Preferably, they are monoolefinic compounds of 3 to 16 carbons, inclusive, with at least one of the carbons of the olefinic double bond directly attached to a hydrogen-bearing carbon atom.

A convenient method for carrying out the process of this invention comprises heating a mixture of hydrocarbon diester of an alkene-1-phosphonic acid, e. g., diethyl ethylenephosphonate, and an olefinic compound of the type defined above, e. g., isobutylene, in at least equimolar proportions, and preferably with an excess of the olefinic compound, in a closed reaction vessel capable of withstanding high pressures to a temperature of 200–375° C. under the autogenous pressure developed by the reaction mixture or, if desired, under further externally applied superatmospheric pressure, e. g., 200 to 1,000 atmospheres or higher of the olefinic compound. The condensation reaction of this invention is independent of the pressure—the only critical factor necessary to the reaction being the temperature. From normal concentration considerations, pressures appreciably above atmospheric are necessary in the case of those olefins, which, under normal conditions, have appreciably high vapor pressures. Obviously, this becomes even more necessary with those monoolefins which are gaseous under normal conditions.

It is essential that no polymerization catalyst be present in the reaction mixture. In fact, although not essential to the course of the reaction, a polymerization inhibitor is advantageously included to prevent polymerization of the unsaturated reactants. The resulting addition product of one mole of the dihydrocarbon 1-alkenephosphonate with one mole of the olefinic compound is isolated from the reaction mixture by conventional methods, e. g., by fractional distillation. The addition product is a dihydrocarbon ester of an alkene-4-phosphonic acid, e. g., diethyl 4-methylpentene-4-phosphonate.

The process of this invention can also be carried out in a continuous manner. In this embodiment, which is very desirable for large-scale operations, the mixture of the 1-alkenephosphonic acid diester and the olefin is passed through a heated reaction zone, if desired in the presence of an inert diluent, e. g., benzene, at a temperature of 200–375° C. The resultant alkene-4-phosphonic acid diester is isolated from the reaction mixture by known methods, most simply by fractional distillation.

The following examples in which the parts given are by weight, unless otherwise specified, illustrate specific embodiments of this invention:

Example I

A pressure resistant reaction vessel of internal capacity corresponding to 400 parts of water is charged with 35 parts of diethyl ethylenephosphonate, 200 parts of isobutylene and 45 parts of benzene and the reactor closed and heated for one hour at 260° C. The maximum pressure developed is 900 atmospheres and there is a pressure drop of 200 atmospheres during the course of the reaction. At the end of the reaction period, the reactor is cooled, vented to the atmosphere, opened and the reaction product (70 parts) removed. Fractionation of the reaction product gives 30 parts of benzene, 17 parts (about 50% recovery) of diethyl ethylenephosphonate, B. P. 70–75° C. under a pressure corresponding to that of 4 mm. of mercury, and 6 parts of diethyl 4-methylpentene-4-phosphonate, B. P. 85–88° C. under a pressure corresponding to that of 8 mm. of mercury, $n_D^{25}=1.4403$.

Anal.—Calc'd. for $C_{10}H_{21}O_3P$: C, 54.55%; H, 9.54%; P, 13.86%. Found: C, 54.82%; H, 10.09%; P, 14.20%.

A similar reaction carried out at 280° C. for one hour, using 80 parts of diethyl ethylenephosphonate, 200 parts of isobutylene, and about 23 parts of benzene yielded 48 parts of diethyl 4-methylpentene-4-phosphonate, B. P. 124° C. under a pressure corresponding to that of 8.5 mm. of mercury, $n_D^{25}=1.4418$.

Anal.—Calc'd. for $C_{10}H_{21}O_3P$: P, 13.86%. Found: P, 14.12%.

Example II

A mixture of 25 parts of dimethyl 1-methylethylene-phosphonate and 175 parts of isobutylene is heated at 280° C. for two hours in a pressure resistant reaction vessel under autogenous pressure. At the end of this time, the reactor is cooled, opened to the atmosphere and the reaction mixture removed. Fractionation of this crude reaction mixture yields 7 parts (28% recovery) of dimethyl propene-2-phosphonate and 2 parts of dimethyl 1,4-dimethylpentene-4-phosphonate, B. P. 125° C. under a pressure corresponding to that of 12 mm. of mercury, $n_D^{25}=1.4492$.

Anal.—Calc'd for $C_9H_{19}O_3P$: P, 15.05%. Found: P, 14.60%, 14.65%.

Example III

A mixture of 40 parts of dimethyl 1-methylethylene phosphonate and 150 parts of diisobutylene is heated in a pressure resistant reaction vessel at 350° C. for three hours under autogenous pressure. At the end of this time, the reactor is cooled, opened to the atmosphere, and the liquid reaction product removed. Fractionation of the crude reaction mixture yields 20 parts (50% recovery) of dimethyl propene-2-phosphonate and 12 parts of crude dimethyl 1-methyl-4-neopentylpentene-4-phosphonate B. P. 120–123° C. under a pressure corresponding to that of 3 mm. of mercury. Redistillation of this product yields 8 parts of purified dimethyl 1-methyl-4-neopentylpentene-4-phosphonate, B. P. 125–127° C. under a pressure corresponding to that of 3.5 mm. of mercury, $n_D^{25}=1.4530$.

Anal.—Calc'd. for $C_{13}H_{27}O_3P$: C, 59.60%; H, 10.32%; P, 11.84%. Found: C, 59.95%; H, 10.58%; P, 11.93%.

It will be understood that the above examples are merely illustrative and that the present invention broadly comprises reacting in the absence of a polymerization catalyst and at elevated temperature a diester of an alkene-1-phosphonic acid in which the 2-carbon relative to the phosphorus carries at least one hydrogen, with an olefinic compound of at least 3 carbons and free of conjugated unsaturation, and the diesters of alkene-4-phosphonic acids resulting therefrom.

These diesters of alkene-4-phosphonic acids have the following structure:

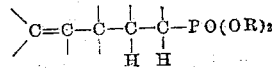

wherein the indicated free valences of the carbons are satisfied by hydrogen or organic radicals and the two ester groups (R) are hydrocarbons free of reactive hydrogens and can be alike or different. The preferred compounds of this invention possess the same molecular structure with the indicated free valences being satisfied by hydrogen or solely hydrocarbon radicals—the two indicated ester groups being also solely hydrocarbon. The most preferred compounds of this invention are the alkene-4-phosphonate diesters, which other than the phosphorus and oxygen atoms are solely hydrocarbon and contain no more than 7 carbons in either of the ester groups and no more than 18 carbons in the alkene radical, i. e., compounds of the above structural formula wherein the R's are hydrocarbon of no more than 7 carbons each and the indicated free valences of the carbons are filled by hydrogen or hydrocarbon radicals totalling no more than 13 carbons.

The process of this invention is generally applicable to any diester of an alkene-1-phosphonic acid in which the 2-carbon relative to the phosphorus carries at least one hydrogen. The ester groups in these diesters should be free of reactive hydrogen, i. e., Zerewitinoff, hydrogens, and it is preferred that the alkene group should also be free of reactive hydrogens.

Because of the increased reactivity, the process of this invention is of outstanding utility when applied to the dihydrocarbon esters of 1-alkenephosphonic acids, which are solely hydrocarbon other than the phosphorus and oxygen. Thus, the preferred alkenephosphonate diesters to which the process of this invention is applied are those in which the phosphonic ester group is attached to one of the doubly bonded carbons and wherein the alkenephosphonate diesters have the following general formula:

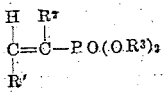

wherein $R^1$, $R^2$, and $R^3$, which may be alike or different, are hydrocarbon radicals free of reactive hydrogens, i. e., Zerewitinoff hydrogens, and preferably solely hydrocarbon of no more than 7 carbons apiece and may be alkyl, alkenyl, aryl, cycloalkyl, aralkyl, alkaryl in nature. $R^1$ and $R^2$, but not $R^3$, may also be hydrogen.

These alpha, beta-ethylenically unsaturated phosphonic acid diesters can be prepared according to the processes described in U. S. Patent 2,365,466, the disclosures of which are hereby incorporated. Because of their readier availability, lower cost and greater reactivity, it is preferred to use the solely hydrocarbon diesters of 1-alkenephosphonic acids, wherein the two ester groups are of no more than 7 carbons apiece, i. e., alkyl, aryl, aralkyl, alkaryl, or cycloalkyl hydrocarbon radicals of from 1 to 7 carbons, and the alkene radical is of no more than 9 carbons.

In addition to the specific alkene-1-phosphonate diesters used in the examples other dihydrocarbon alkenephosphonates can be used. Specific examples of these include dialkyl alkenephosphonates such as, dibutyl 1-methylethylenephosphonate; diaryl alkenephosphonates, e. g., diphenyl ethylenephosphonate, diphenyl 1-methylethylenephosphonate; diaralky alkenephosphonates, e. g., dibenzyl ethylenephosphonate; dialkylene 1-substituted alkenephosphonates, e. g., diallyl 1-methylethylenephosphonate; dialkyl 1,2-di-substituted alkenephosphonates, e. g., dimethyl 1-methylpropene-1-phosphonate, dimethyl 1-phenyl-ethylenephosphonate; diethyl 1-carboxymethylethylenephosphonate and the like.

The unsaturated reactants which are reacted with the above-described alkene-1-phosphonate diesters in the process of this invention to form the new alkene-4-phosphonate diesters of this invention are olefinic compounds having at least one open chain olefinic linkage free of conjugated unsaturation, and, preferably, also being free of reactive hydrogen, i. e., Zerewitinoff hydrogen, and having joined to one of the doubly bonded carbons, a carbon atom containing at least one hydrogen atom attached thereto. The essential portion of these unsaturated reactants, which is necessary for reaction with the alkene-1-phosphonate diesters, is the

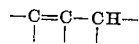

structure.

Specific examples of olefinic compounds of this type, which can be used in the process of this invention to make selected diesters of this invention, include solely hydrocarbon monoolefins, e. g., 1-propene, 1-butene, 2-butene, triisobutylene, beta-pinene, tetramethylethylene, diallyl, alpha-methylstyrene, 1-pentene, 1-heptene, 1-hexene, 1-octene, 1-decene, 1-hexadecene, allyl benzene; substituted olefins, e. g., unsaturated nitriles such as, allyl cyanide, 5-methyl-5-hexenenitrile, 5-hexenenitrile, unsaturated esters such as, methyl 5-methyl-5-hexenoate, unsaturated ketones such as, methyl heptenone, unsaturated acids such as 5-methyl-5-hexenoic acid, 5-hexenoic acid, and unsaturated amines such as 6-methyl-6-hepteneamine, 6-hepteneamine. The preferred type of olefinic compounds are the open-chain monoolefinic hydrocarbons of the above-defined structure. Especially preferred are the solely hydrocarbon monoolefins of from 3 to 16, and particularly from 3 to 8, carbon atoms, inclusive, which carry an alkyl group, preferably methyl, as a side chain attached to at least one of the carbon atoms comprising the ethylenic linkage.

The proportions of the two types of reactants can be varied widely in the process of this invention. Equimolar proportions of the alkene-1-phosphonate diesters and the above-defined olefinic compounds can be used to carry out the process of this invention. However, because the products of this invention are thereby prepared in higher yields and because the olefinic compounds are, in general, so much cheaper and more readily available than the alkene-1-phosphonate esters, it is preferred to use an excess, most preferably a 300% to 400% excess, of the olefinic compound.

As pointed out previously, it is essential that no polymerization initiator be present in the reaction mixture since in the presence of a polymerization initiator the alkene-1-phosphonate diesters readily homopolymerize and also copolymerize with the polymerizable ethylenically unsaturated olefins. It is not necessary for the operability of the process of this invention that a polymerization inhibitor be present, i. e., the reactant compositions are stable polymerizationwise under the conditions of the reaction, as long as no polymerization initiator is present. However, if desired, a polymerization inhibitor can be used. Examples of such materials include the well-known hydroquinones, copper resinates, naphthylamines, beta-naphthol and other antioxidants recognized in the art.

The reaction between the alkene-1-phosphonate diesters and the olefinic compounds takes place under the previously described conditions in the presence or absence of an inert diluent or solvent. For normal batch-wise operations, there is no preference between using a reaction diluent or not. For continuous reactions, due to the greater convenience, it is normally preferred to use a reaction diluent. Any inert organic material, usually liquid, can be used. Examples of these include hydrocarbons such as benzene, toluene, cyclohexane; ethers such as dioxane and the like.

The reaction of this invention is one that requires elevated temperatures, varying to a considerable extent with the specific reactants as would normally be expected. However, in general a temperature of at least 200° C. will be used as the condensation reaction below that temperature tends to proceed at a rate too slow to be practical. Temperatures of above 375° C. are not advisable due to the tendency toward dimerization and thermal decomposition of the unsaturated reactants. As stated previously, pressure is not a critical factor but, like temperature, will of necessity vary appreciably with the particular reactants being used. For instance, when long-chain or highly branched, i. e., "bushy," monoolefins, which exhibit relatively low vapor pressures under normal conditions, are condensed with the higher alkene-1-phosphonate diesters, the reaction can be effected under atmospheric pressure. However, when the lower alkene-1-phosphonate diesters are used, particularly with the shorter chain monoolefins which exhibit appreciable vapor pressures under normal conditions, and even more particularly with those which are gaseous under normal conditions, superatmospheric pressures are necessary to insure the presence of sufficient quantities of the reactants in the reaction zone. As pointed out previously, a convenient method of insuring such conditions is to carry out the reaction in a closed reactor under the autogenous pressure developed by the reactants at the reaction temperature. Normally, even in the case of the gaseous monoolefins, superatmospheric pressures appreciably above 1,000 atmospheres will not be used for reason of greater cost, although obviously higher pressures can be used.

The compounds obtained by the process of this invention and forming a part of the invention are useful as chemical intermediates, for instance, they are particularly useful as routes to the corresponding phosphonic acids which are otherwise difficult to prepare. These compounds are also effective as insecticides, particularly as miticides and aphicides. Those of higher molecular weight are useful as flameproof plasticizers for addition type polymers.

As many apparently widely different embodiments of this invention may be made without departing from the spirit and scope thereof, it is to be understood that we do not limit ourselves to the specific embodiments thereof except as defined in the appended claims.

The invention claimed is:

1. A diester of an alkene-4-phosphonic acid in which the alkene radical directly bonded to the phosphorus is solely hydrocarbon, contains at least 5 carbons in a straight chain with an ethylenic double bond between the 4- and 5- carbons relative to the phosphorus, contains no more than 18 carbons, and the 1- and 2-carbons thereof relative to the phosphorus each carries at least one hydrogen, said acid being free of conjugated unsaturation.

2. A diester of an alkene-4-phosphonic acid as set forth in claim 1 in which each ester group is a solely hydrocarbon radical containing 1 to 7 carbons, inclusive.

3. Diethyl 4 - methylpentene - 4 - phosphonate having the formula $$CH_2=C(CH_3).CH_2.CH_2.CH_2.PO(OC_2H_5)$$

4. Dimethyl 1,4 - dimethylpentene-4-phosphonate.

5. Dimethyl 1-methyl-4-neopentylpentene - 4 - phosphonate.

CHARLES JOSEPH ALBISETTI, Jr.
MILTON JONES HOGSED.

References Cited in the file of this patent

UNITED STATES PATENTS

| Number | Name | Date |
|---|---|---|
| 2,439,214 | Lindsey | Apr. 6, 1948 |
| 2,486,657 | Kosolapoff | Nov. 1, 1949 |
| 2,535,173 | Tawney | Dec. 26, 1950 |
| 2,535,174 | Tawney | Dec. 26, 1950 |
| 2,568,859 | Ladd | Sept. 25, 1951 |

OTHER REFERENCES

Ford-Moore, J. Chem. Soc. (London) 1947, pages 1465–67.